United States Patent
Ju

(10) Patent No.: US 7,924,926 B2
(45) Date of Patent: *Apr. 12, 2011

(54) VIDEO BIT STREAM DECODING SYSTEM AND METHOD USED IN A VIDEO DECODING APPARATUS

(75) Inventor: Chi-Cheng Ju, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 1183 days.

This patent is subject to a terminal disclaimer.

(21) Appl. No.: 11/599,265

(22) Filed: Nov. 15, 2006

(65) Prior Publication Data

US 2007/0058728 A1 Mar. 15, 2007

Related U.S. Application Data

(63) Continuation of application No. 10/984,736, filed on Nov. 10, 2004, now Pat. No. 7,154,953.

(30) Foreign Application Priority Data

Nov. 13, 2003 (TW) .............................. 92131872 A

(51) Int. Cl.
*H04N 7/12* (2006.01)
(52) U.S. Cl. .............................. 375/240.25; 375/240.01
(58) Field of Classification Search .................. 375/240, 375/240.01, 240.12, 240.25
See application file for complete search history.

(56) References Cited

U.S. PATENT DOCUMENTS 6,631,163 B1 10/2003 Peng ......................... 375/240.25

*Primary Examiner* — Allen Wong
(74) *Attorney, Agent, or Firm* — Patterson & Sheridan, LLP

(57) ABSTRACT

The invention relates to a decoding apparatus and same method for decoding a video bit stream. The apparatus decodes an encoded video bit stream to produce pixel data of a first and second macroblocks. The video bit stream comprises at least one video packet, a first, second, third logic units. The first logic unit comprising parameters a1 and b1. The second logic unit comprises parameters a2 and b2. The third logic unit comprises parameters a3 and b3. The parameters a1 and a2 are used for reconstructing a first macroblock. The parameters b1 and b2 are used for reconstructing a second macroblock. The video decoding apparatus comprises a searching module and a decoding module. The searching module locates a first address indicating location of the first logic unit, a second address indicating location of the second logic unit, and a third address indicating location of the third logic unit. The decoding module first decodes the first logic unit to obtain a decoded parameter A1 corresponding to the parameter a1 without obtaining and storing a decoded parameter B1 corresponding to the parameter b1 into a memory. The decoding module also decodes the second/third logic unit to obtain a decoded parameter A2/A3 corresponding to the parameter a2/a3. Then, the decoded parameters A1, A2, and A3 are used to produce the pixel data of the first macroblock.

20 Claims, 5 Drawing Sheets

VIDEO BIT STREAM DECODING SYSTEM AND METHOD USED IN A VIDEO DECODING APPARATUS

This application is a Continuation of U.S. patent application Ser. No. 10/984,736, now U.S. Pat. No. 7,154,953, entitled "VIDEO BIT STREAM DECODING SYSTEM AND METHOD USED IN A VIDEO DECODING APPARATUS" and filed on Nov. 10, 2004.

BACKGROUND OF THE INVENTION

1. Field of the Invention

This invention relates to a decoding system and method for decoding a bit stream with the characteristic of data partition; more particularly, the present invention relates to a video decoding system and method employed in a video decoding apparatus for decoding a video bit stream having the characteristic of data partition.

2. Description of the Prior Art

Various standards have been established to facilitate transmitting, storing, and modifying digital multimedia data. For the Moving Picture Coding Experts Group/IV (MPEG4) standard ISO/IEC 14496-2, which is one of the video encoding standards, the corresponding tools can support a wide variety of encoding characteristics. Because the MPEG4 standard has flexible encoding structures, the MPEG4 standard can support various kinds of different encoding tool combinations. MPEG4 can also support the required functions corresponding to different kinds of software applications, for example: electronic calculators, distance educations, and entertainment businesses.

The decoding method of the data partition video bit stream is one of the key technologies used by video apparatus. In general, the data partition video bit stream includes at least one video packet. The video packet includes a plurality of logic units. Each logic unit includes at least one encoded parameter. After the corresponding encoded parameters of all the logic units have been decoded, the data required to form the video macroblock can be obtained.

FIG. 1 is quoted from the Moving Picture Coding Experts Group/IV standard ISO/IEC 14496-2, and is a schematic diagram of a video packet of a data partition predictive video object plane (P-VOP). The data partition video packet 20 includes three logic units, which are the first logic unit 22, the second logic unit 24, and the third logic unit 26 respectively. The first logic unit 22, the second logic unit 24, and the third logic unit 26 are in a loop form. Besides, the video packet (not shown) of a data partition intra video object plane (I-VOP) and the video packet 20 of a data partition P-VOP have similar structures; both comprise three logic units, and both belong to one of the forms of the video packet of a data partition MPEG4 video object plane (MPEG4-VOP).

The starting positions of the first logic unit 22, the second logic unit 24, and the third logic unit 26 to be decoded are the positions indicated by mark 21, mark 23, and mark 25 respectively, and they are the first starting decoding address, the second starting decoding address, and the third starting decoding address, respectively. A resynchronization marker 29 is located between the first logic unit 22 and the second logic unit 24 to clearly divide the first logic unit 22 and the second logic unit 24, but no resynchronization marker is located between the second logic unit 24 and the third logic unit 26.

Referring to FIG. 2, FIG. 2 is a schematic diagram of the encoded parameters of the video packet. The video packet 30 includes three logic units, which are the first logic unit 32, the second logic unit 34, and the third logic unit 36, respectively.

The required three corresponding encoded parameters, which are respectively a1 41, a2 42, and a3 43, for later decoding operations to produce the plurality of the pixel data of the macroblock A (not shown), and they are distributed in the first logic unit 32, the second logic unit 34, and the third logic unit 36, respectively. After the encoded parameters (a1 41, a2 42, and a3 43) are decoded, the three decoded parameters (A1, A2, and A3, not shown) are obtained, wherein a1 41, a2 42, and a3 43 correspond to A1, A2, and A3. After the three decoded parameters (A1, A2, and A3) are integrated, and after the later decoding operations, the plurality of pixel data required to form the macroblock (A) can be obtained.

The required three corresponding encoded parameters, which are respectively b1 44, b2 45, and b3 46, for later decoding operations to produce the plurality of the pixel data of the macroblock B (not shown), and they are distributed in the first logic unit 32, the second logic unit 34, and the third logic unit 36 respectively. After the encoded parameters (b1 44, b2 45, and b3 46) are decoded, the three decoded parameters (B1, B2, and B3, not shown) are obtained, wherein b1 44, b2 45, and b3 46 correspond to B1, B2, and B3. After the three decoded parameters (B1, B2, and B3) are integrated, and after the later decoding operations, the plurality of pixel data required to form the macroblock (B) can be obtained.

The required three corresponding encoded parameters, which are respectively c1 47, c2 48, and c3 49, for later decoding operations to produce the plurality of the pixel data of the macroblock C (not shown), and they are distributed in the first logic unit 32, the second logic unit 34, and the third logic unit 36 respectively. After the encoded parameters (c1 47, c2 48, and c3 49) are decoded, the three decoded parameters (C1, C2, and C3, not shown) are obtained, wherein c1 47, c2 48, and c3 49 correspond to the C1, C2, and C3. After the three decoded parameters (C1, C2, and C3) are integrated, and after the later decoding operations, the plurality of pixel data required to form the macroblock (C) can be obtained.

The decoding method in the related art briefly includes the following steps. After sequentially decodes the encoded parameters (a1 41, b1 44, and c1 47) of the first logic unit 32, the related art method sequentially outputs and temporarily stores the decoded parameters (A1, B1, and C1) in a memory, such as a Dynamic Random Access Memory (DRAM).

After all the encoded data in the first logic unit 32 have been completely outputted and temporarily stored in the memory, then the second logic unit can be decoded. After the a2 42, b2 45, and c2 48 of the second logic unit 34 have been sequentially decoded, the related art method sequentially outputs and temporarily stores the A2, B2, and C2 in the memory. After all the encoded data in the second logic unit 34 have been completely outputted and temporarily stored in the memory, then the third logic unit can be decoded.

When decoding the encoded data of the third logic unit 36, there is a difference in comparison with the aforementioned steps. That is, after the related art method decodes the a3 43 of the third logic unit 36 to obtain the decoded data A3, it reads the A1 and A2 stored in the memory in order to obtain all decoded parameters A1, A2 and A3. After A1, A2, and A3 are integrated, the integrated data for later decoding operations of the plurality of pixel data required to form the macroblock A can be obtained. Then, the related art method performs the decoding operation according to the integrated data, so as to completely obtain the plurality of pixel data of the video macroblock A. After the a3 43 is decoded, the related art method decodes the encoded data (b3 46) of the third logic unit 36 next. After the B3 is obtained, the related art method reads the B1 and B2 stored in the memory. After B1, B2, and B3 are integrated, the integrated data for later decoding operations of the plurality of pixel data required to form the macroblock B can be obtained. Then, the related art method performs the decoding operation according to the integrated data, so as to completely obtain the plurality of pixel data of the video macroblock B. After the b3 46 is decoded, the related art method decodes the encoded data c3 49 of the third logic unit 36 next. After the C3 is obtained, the related art method reads the C1 and C2 stored in the memory. After C1, C2, and C3 are integrated, the integrated data for later decoding operations of the plurality of pixel data required to form the macroblock C can be obtained. The related art method performs the decoding operation according to the integrated data, so as to completely obtain the plurality of pixel data of the video macroblock (C); then, the decoding operations of the video packet 30 is completed. Next, the related art method decodes the other video packets of the video bit stream according to the same steps, so as to complete the decoding operations of the video bit stream.

The related art decoding method has disadvantages, and some are listed as follows. Firstly, it requires larger memory space for storing the decoded data obtained by decoding the first and the second logic unit, and thus it costs more. Secondly, the decoded data obtained by decoding the first and the second logic unit must be temporarily stored in the memory, and then is later retrieved when the third logic unit is decoded. These storing and reading operations consume time, and thus more time is required to decode and form a macroblock. Furthermore, the required system bandwidth is greatly increased due to these storing and retrieving operations.

Therefore, an objective of the present invention is to provide a decoding system and method of the video bit stream for solving the aforementioned problems.

SUMMARY OF THE INVENTION

The present invention provides a decoding system and method applied in a video decoding apparatus for decoding a video bit stream, then decreasing the decoding time of the video bit stream, and increasing the decoding efficiency.

The decoding method of the present invention is used for decoding a video bit stream. The video bit stream includes at least one video packet. The video packet includes a packet header and a plurality of logic units. Each logic unit includes at least one encoded parameter. The encoded parameters separately embedded in different logic units can be decoded in later decoding operations to obtain a corresponding video macroblock. The decoding method generally includes the following steps: first, search for the starting decoding addresses corresponding to all the logic units respectively in a video packet and store the corresponding starting decoding addresses; next, decode the encoded parameters of the logic units according to the starting decoding addresses, so as to obtain a plurality of pixel data required to form the video macroblock after later decoding operation.

In one embodiment according to the present invention, a decoding method is disclosed for decoding an encoded video bit stream to produce pixel data of a first macroblock and a second macroblock. The video bit stream comprises at least one video packet. The video packet comprises a first logic unit and a second logic unit. The first logic unit further comprises parameters a1 and b1. The second logic unit further comprises parameters a2 and b2. The parameters a1 and a2 would be used for reconstructing a first macroblock. The parameters b1 and b2 would be used for reconstructing a second macroblock. The method according to this embodiment comprises steps one to three. The first step is to locate a first address indicating location of the first logic unit and locating a second address indicating location of the second logic unit. The second step is to use variable length decoding method to decode the first logic unit to obtain a decoded parameter A1 corresponding to the parameter a1 and to decode the second logic unit to obtain a decoded parameter A2 corresponding to the parameter a2. The third step is to produce the pixel data of the first macroblock using the decoded parameters A1 and A2.

In another embodiment according to the present invention, a decoding method is disclosed for decoding an encoded video bit stream to produce pixel data of a first macroblock and a second macroblock. The video bit stream comprises at least one video packet. The video packet comprises in sequential order a packet header, a first logic unit, a second logic unit, and a third logic unit. The first logic unit further comprises parameters a1 and b1. The second logic unit further comprises parameters a2 and b2. The third logic unit further comprises parameters a3 and b3. The parameters a1 and a2 would be used for reconstructing a first macroblock. The parameters b1 and b2 would be used for reconstructing a second macroblock. The method according to this embodiment comprises steps one to seven. The first step is to locate a first address indicating location of the first logic unit. The second step is to decode the first logic unit to obtain a decoded parameter A1 corresponding to the parameter a1 without obtaining and storing a decoded parameter B1 corresponding to the parameter b1 into a memory. The third step is to locate a second address indicating location of the second logic unit. The fourth step is to decode the second logic unit to obtain a decoded parameter A2 corresponding to the parameter a2. The fifth step is to locate a third address indicating location of the third logic unit. The sixth step is to decode the third logic unit to obtain a decoded parameter A3 corresponding to the parameter a3. The seventh step is to produce the pixel data of the first macroblock using the decoded parameters A1, A2 and A3.

In another embodiment according to the present invention, a decoding apparatus is disclosed for decoding an encoded video bit stream to produce pixel data of a first and second macroblocks. The video bit stream comprises at least one video packet, a first, second, third logic units. The first logic unit comprising parameters a1 and b1. The second logic unit comprises parameters a2 and b2. The third logic unit comprises parameters a3 and b3. The parameters a1 and a2 are used for reconstructing a first macroblock. The parameters b1 and b2 are used for reconstructing a second macroblock. The video decoding apparatus comprises a searching module and a decoding module. The searching module locates a first address indicating location of the first logic unit, a second address indicating location of the second logic unit, and a third address indicating location of the third logic unit. The decoding module first decodes the first logic unit to obtain a decoded parameter A1 corresponding to the parameter a1 without obtaining and storing a decoded parameter B1 corresponding to the parameter b1 into a memory. The decoding module also decodes the second/third logic unit to obtain a decoded parameter A2/A3 corresponding to the parameter a2/a3. Then, the decoded parameters A1, A2, and A3 are used to produce the pixel data of the first macroblock.

By parallel or sequentially decoding the corresponding encoded parameters in the logic units, the present invention can effectively decrease the decoding time, save the memory space and system bandwidth, and further decrease the cost.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 3:
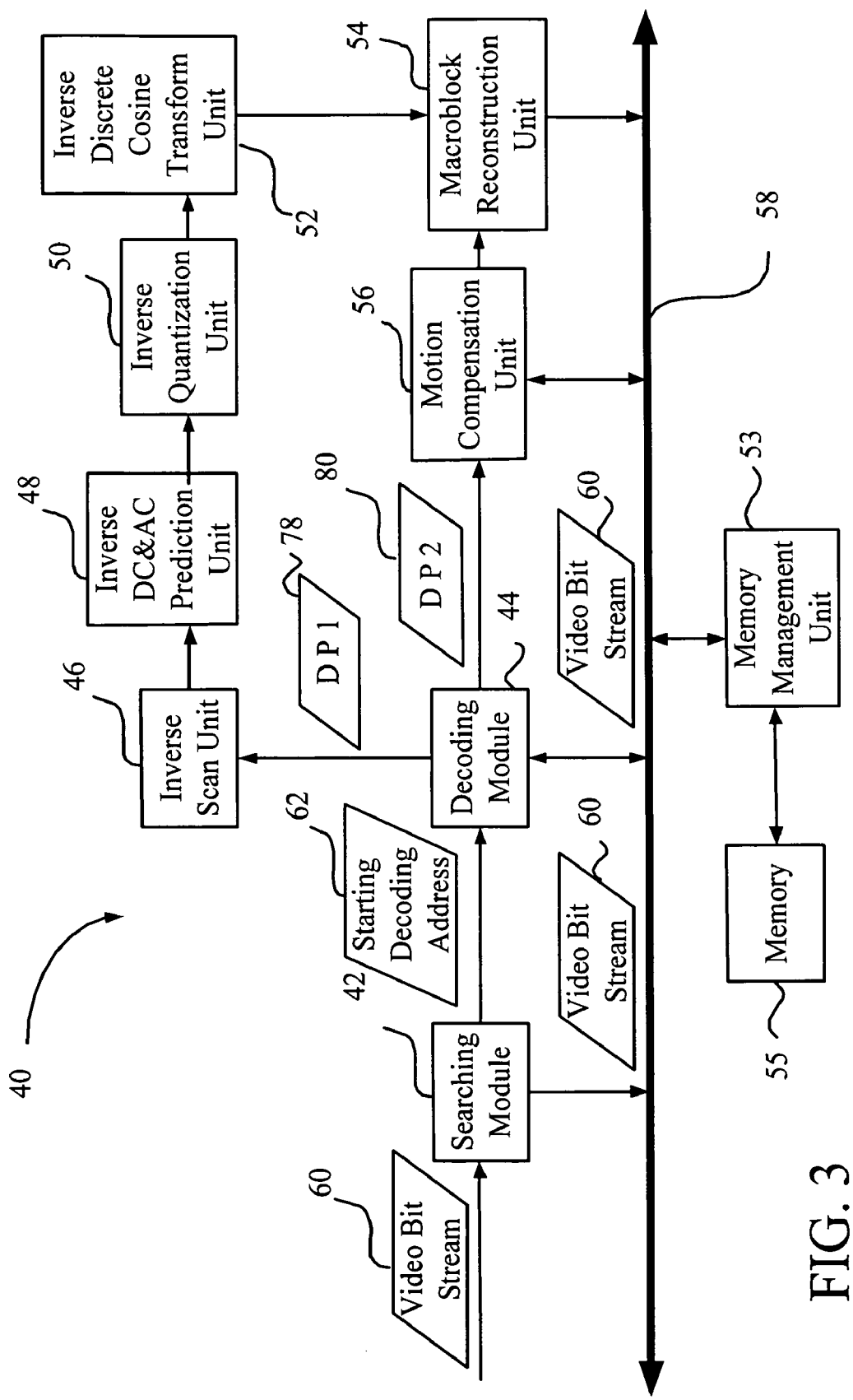
FIG. 3 is a schematic diagram of the decoding system according to the present invention.

Referring to FIG. 3, FIG. 3 is a schematic diagram of the decoding system 40 according to one embodiment of the present invention. The decoding system 40 includes a searching module 42, a decoding module 44, an inverse scan unit 46, an inverse DC & AC prediction unit 48, an inverse quantization unit 50, an inverse Discrete Cosine Transform unit 52, a macroblock reconstruction unit 54, a motion compensation unit 56, a memory management unit 53, a memory 55, and a transmission bus 58.

The decoding system 40 is used for decoding a video bit stream 60. The video bit stream 60 includes a plurality of video packets, and each of the video packets includes a packet header and a plurality of logic units. Each logic unit includes at least an encoded parameter; the encoded parameter has corresponding encoded parameters separately located in other logic units. After the encoded parameter and the corresponding encoded parameters are obtained, they will be used for further decoding to reconstruct video macroblock. The video packet may include a resynchronization marker and the resynchronization marker may be located between some logic units, for example, between the first logic unit and the second logic unit.

The searching module 42 of the decoding system 40 is used for receiving the video bit stream 60 and locating starting decoding addresses of all logic units in the video packet of the video bit stream 60. After these starting decoding addresses 62 are located, they will be transmitted to the decoding module 44.

The decoding module 44 is used for receiving the video bit stream 60 and the corresponding starting decoding addresses 62 of the logic units in the video packet of the video bit stream. The decoding module 44 is also used for decoding each logic unit and obtain the encoded parameter and the corresponding encoded parameters. The encoded parameter and the corresponding encoded parameters are used for further decoding to reconstruct the video macroblock.

As for the searching module 42, a further description is given as follows. A video packet includes N logic units. The searching module 42 is used for performing a searching procedure, which performs the following steps to obtain the corresponding starting decoding addresses of all the logic units. In the beginning of a video packet in a video bit stream, a packet header is located there. Hence, the starting decoding address of the first logic unit of the logic units in a video packet can be obtained by finding the packet header of the video packet.

After the starting decoding address of the first logic unit of the N logic units in the video packet is located, the searching module 42 searches for the addresses of all the resynchronization markers located between the logic units in the video packet and therefore obtains the starting decoding address of the next logic unit. Taking the Moving Picture Coding Experts Group/IV (MPEG4) video standard as an example, a video packet includes three logic units. A resynchronization marker is located between the first and the second logic unit. The searching module searches the resynchronization marker in the video packet. The located address of the resynchronization marker is the starting decoding address of the logic unit next to the resynchronization marker.

For each of those logic units whose starting decoding addresses have not been located in the aforementioned process, the decoding module 44 performs a fast decoding procedure to the prior logic unit, so as to obtain its corresponding starting decoding address. And the decoding module 44 continues the fast decoding procedure to obtain the corresponding starting decoding addresses of all the logic units whose starting decoding addresses have not been located in the aforementioned process. Note that the purpose of the fast decoding procedure is only to locate the starting decoding address of the next logic unit, therefore the fast decoding procedure is different from an simpler than an ordinary decoding procedure. In the ordinary decoding procedure, the logic unit is completely decoded and the encoded parameters located in the logic unit are obtained and generally are stored in a memory for later retrieval. In the fast decoding procedure, the logic unit is decoded only enough to obtain the starting address of the next logic unit, and the decoded data obtained in the fast decoding procedure do not need to be stored in the memory.

Figure 4:
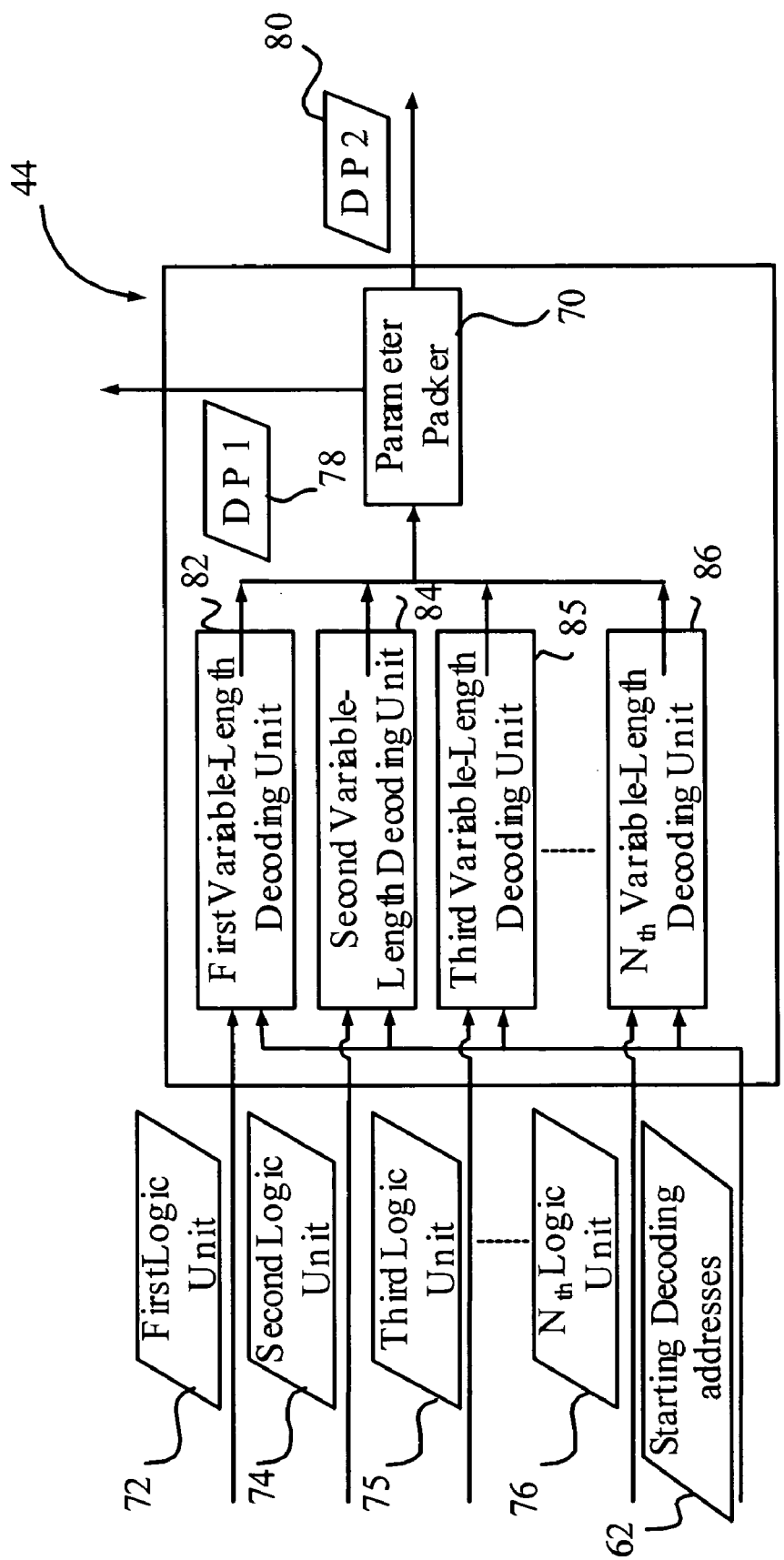
FIG. 4 is a block diagram of the decoding module shown in FIG. 3.

Referring to FIG. 4, FIG. 4 is a block diagram of the decoding module 44 shown in FIG. 3. The decoding module 44 can be a variable-length decoding module. The variable-length decoding module includes N variable-length decoding units (82, 84, 85, and 86) and a parameter packer 70.

The N variable-length decoding units (82, 84, 85, and 86) respectively receive the corresponding N starting decoding addresses 62 of the video packet. According to the starting decoding addresses 62, the N variable-length decoding units reads the bit stream through the memory management unit 53 stored in the memory 55 of the N logic units (72, 74, 75, and 76) in a video packet of the video bit stream, and performs the variable-length decoding of the first logic unit and the other logic units in the video packet; that means the plurality of encoded parameters of the N logic units (72, 74, 75, and 76) of each video packet are decoded in parallel at the same time. In this embodiment, the first variable-length decoding unit 82 is used for decoding the first logic unit 72; the second variable-length decoding unit 84 is used for decoding the second logic unit 74, and so on. The Nth variable-length decoding unit 86 is used for decoding the Nth logic unit 76. The corresponding encoded parameters of the N logic units are decoded by the variable length and outputted to a parameter packer 70. The parameter packer 70 collects and integrates the corresponding encoded parameters of the N logic units. Then, the parameter packer 70 outputs the decoded parameters, which are the first decoded parameter (DP1) 78 and the second decoded parameter (DP2) 80, corresponded to a video macroblock.

Please refer to FIG. 3 and FIG. 4. The parameter packer 70 of the Decoding Module 44 outputs the first decoded parameter (DP1) 78 and the second decoded parameter (DP2) 80. The first decoded parameter (DP1) 78 is passed to the inverse scan unit 46, the inverse DC&AC prediction unit 48, the inverse quantization unit 50, and the inverse Discrete Cosine Transform unit 52 to the macroblock reconstruction unit 54 for corresponding operations. The second decoded parameter (DP2) 80 is passed to the motion compensation unit 56 for corresponding operation. The motion compensation unit 56 reads the prediction block of the reference picture stored in the memory 55 through the memory management unit 53, and it performs the motion compensation operation of the block; in the meantime, the motion compensation unit 56 transmits data to the macroblock reconstruction unit 54. According to the data transmitted from the inverse Discrete Cosine Transform unit 52 and the motion compensation unit 56, the macroblock reconstruction unit 54 reconstructs the video macroblock and transmits the obtained reconstructed macroblock data to the memory 55 through the memory management unit 53.

Figure 1:
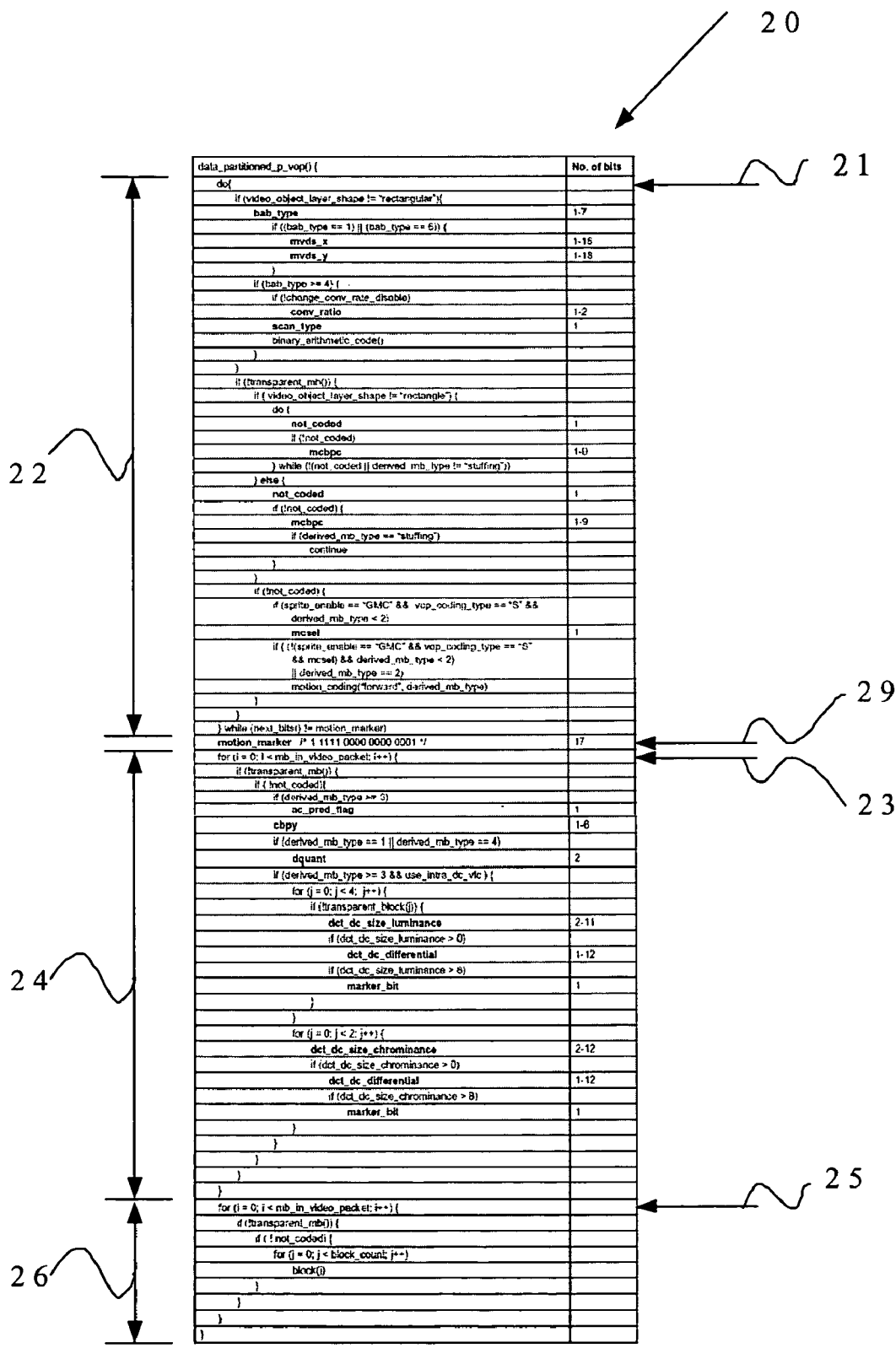
FIG. 1 is a schematic diagram of a related art video packet of a data partition of a predictive video object plane.
Figure 2:
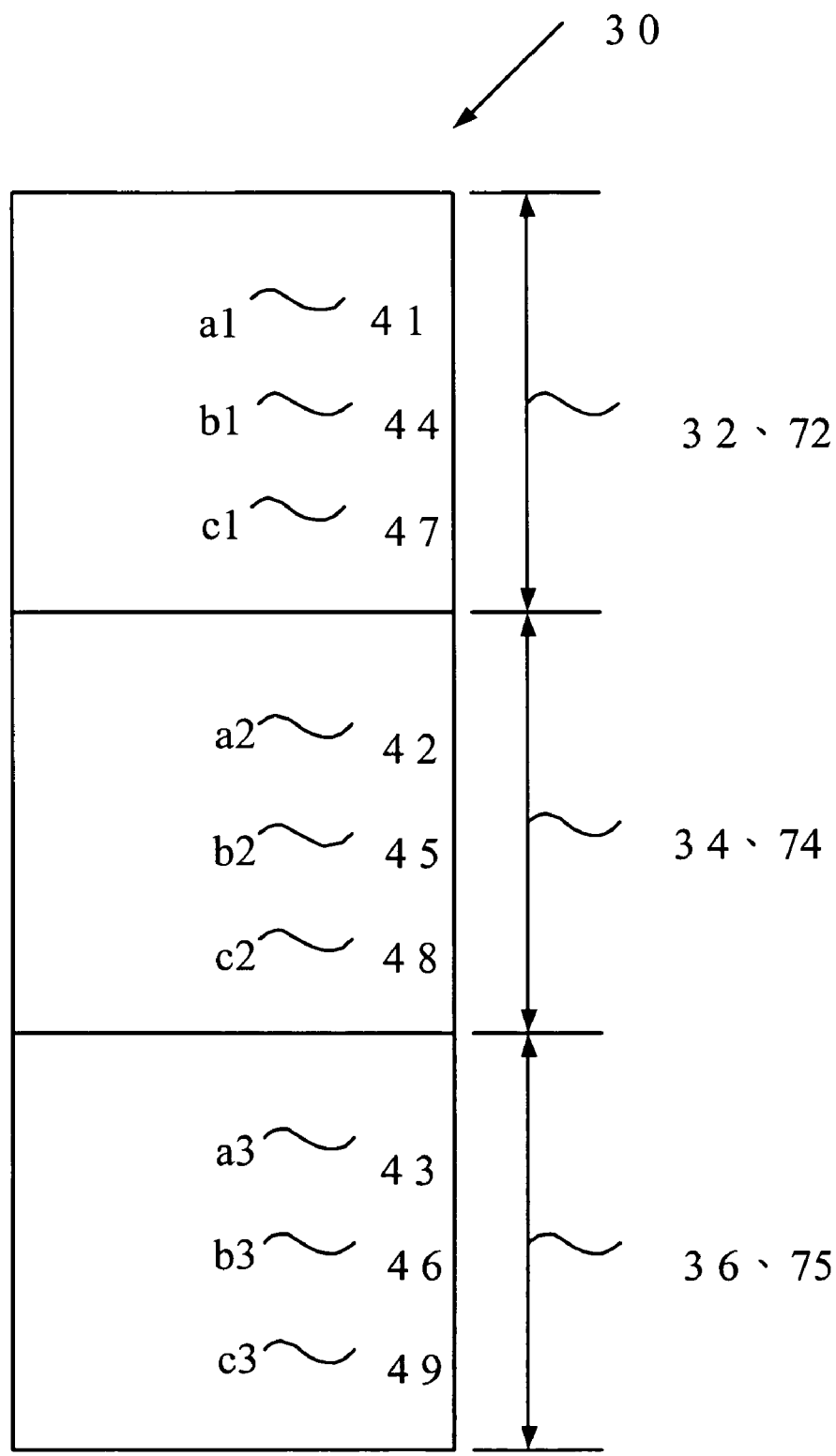
FIG. 2 is a schematic diagram of the encoded parameters of the video packet.

Referring to FIG. 2 and FIG. 4. More detailed description for decoding the encoded parameters of the logic units in a video packet conforming to MPEG4 video standard is as follows. The video packet conforming to MPEG 4 video standard includes a first logic unit 72, a second logic unit 74, and a third logic unit 75. The first logic unit is a DO_WHILE loop, and the second logic unit and the third logic unit are FOR loop, respectively.

Firstly, in order to decode the corresponding three encoded parameters required for later decoding operations to obtain the macroblock A, this embodiment performs in a parallel manner to decode a1 41 of the first logic unit 72 by the first variable-length decoding unit 82, a2 42 of the second logic unit 74 by the second variable-length decoding unit 84, and a3 43 of the third logic unit 75 by the third variable-length decoding unit 85, so as to respectively obtain decoded parameters A1, A2, and A3 (not shown in the figures) to be transmitted to the parameter packer 70. The parameter packer 70 integrates the decoded parameters A1, A2, and A3 and obtains the data required for later decoding operations to reconstruct the macroblock A. Then, the parameter packer 70 outputs the first decoded parameter (DP1) and the second decoded parameter (DP2).

This embodiment also performs in a parallel manner to decode b1 44 of the first logic unit 72 by the first variable-length decoding unit 82, b2 45 of the second logic unit 74 by the second variable-length decoding unit 84, and b3 46 of the third logic unit 75 by the third variable-length decoding unit 85, so as to obtain the decoded parameters B1, B2, and B3 (not shown in the figures) to be transmitted to the parameter packer 70. The parameter packer 70 integrates the decoded parameters B1, B2, and B3 and obtains the data required for later decoding operations to construct macroblock B. Then, the parameter packer 70 outputs the first decoded parameter (DP1) and the second decoded parameter (DP2).

This embodiment also performs in a parallel manner to decode c 147 of the first logic unit 72 by the first variable-length decoding unit 82, c2 48 of the second logic unit 74 by the second variable-length decoding unit 84, and c3 49 of the third logic unit 75 by the third variable-length decoding unit 85, so as to respectively obtain decoded parameters C1, C2, and C3 to transmitted to the parameter packer 70. The parameter packer 70 integrates the decoded parameters C1, C2, and C3 and obtains the data required for later decoding operations to construct macroblock C. Then, the parameter packer 70 outputs the first decoded parameter (DP1) and the second decoded parameter (DP2).

The decoding system 40 of the first embodiment parallelly decodes the first logic unit 72 by the first variable-length decoding unit 82, decodes the second logic unit 74 by the second variable-length decoding unit 84, and decodes the third logic unit 75 by the third variable-length decoding unit 85. Therefore, the decoding system 40 of the first embodiment can efficiently reduce the decoding time. Besides, the decoding system 40 does not need to temporarily store all decoded data obtained by the first and second logic unit in the memory for later retrieval, therefore the decoding system 40 saves memory space and the bandwidth required to store and retrieve data. Hence, the system cost can be further decreased.

Figure 5:
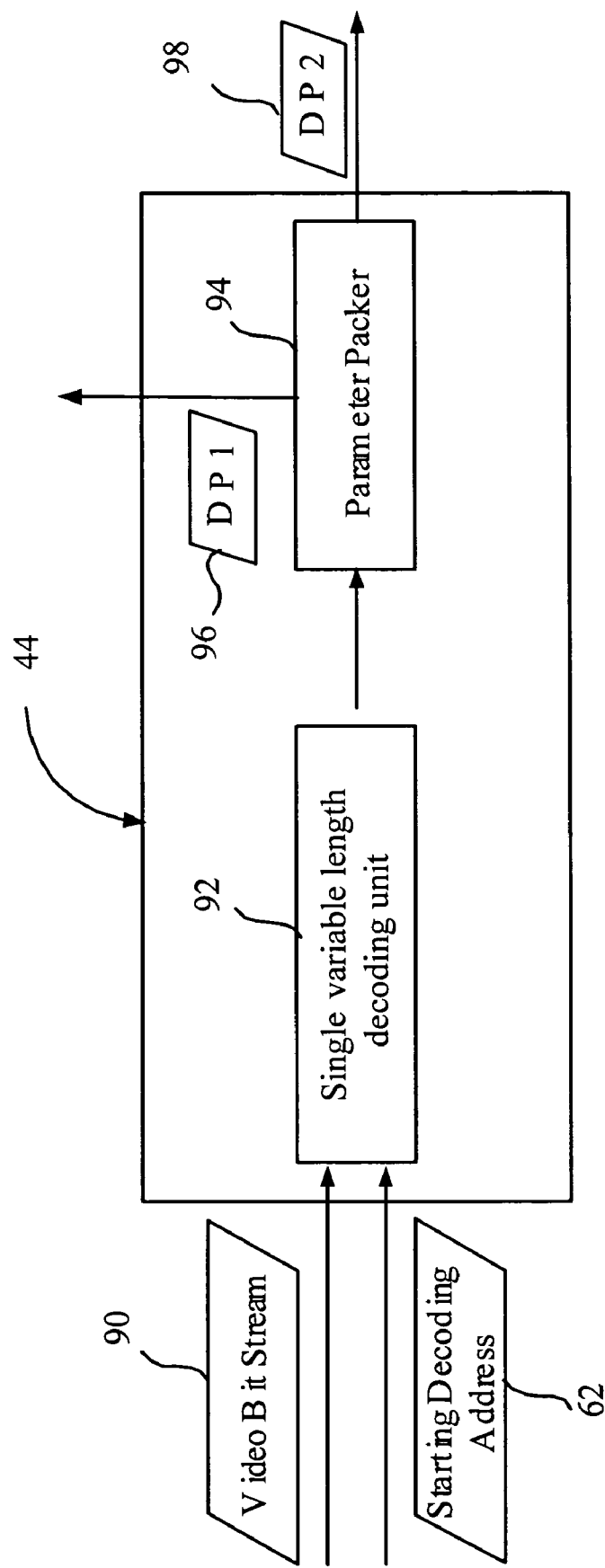
FIG. 5 is a block diagram of the decoding module according to another embodiment of the present invention.

Referring to FIG. 5, FIG. 5 is a block diagram of the decoding module 44 according to another embodiment of the present invention. The decoding module 44 of this embodiment of the present invention includes a single variable-length decoding unit 92 and a parameter packer 94.

The single variable-length decoding unit 92 is used for accessing the N logic units of a data partition video packet corresponding to a video bit stream 90 and for sequentially performing the variable-length decoding to the first logic unit and the other logic units of the video packet according to the corresponding N starting decoding addresses 62. And the single variable-length decoding unit 92 variable length decodes the corresponding encoding parameters of N logic units and outputs the decoded parameters to the parameter packer 94. After the parameter packer 94 integrates the decoded parameters of the N logic units, the parameter packer 94 outputs two decoded parameters, which are the first decoded parameter (DP1) 96 and the second decoded parameter (DP2) 98.

The difference between the N variable-length decoding units (82, 84, 85, and 86) and the single variable-length decoding unit 92 is as follows. The N variable-length decoding units (82, 84, 85, and 86) are used for parallelly receiving and decoding the plurality of encoded parameters of N logic units of each video packet. The decoded parameters decoded by the N variable-length decoding units are integrated by the parameter packer 70 to obtain the data required. The single variable-length decoding unit 92 is used for sequentially receiving the corresponding encoded parameters of N logic units of each video packet and for integrating the corresponding decoded parameter, decoded by the single variable-length decoding unit 92, of the N logic units through the parameter packer 94 to obtain the data required for later decoding operations to obtain the video macroblock.

The method of decoding the encoded parameters of the logic units of the second embodiment is described in detail in the following paragraphs by the schematic diagram of the video packet, conformed to the MPEG4 video standard, shown in FIG. 2 and FIG. 5. First, the decoding module decodes the three corresponding set of encoded parameters required for later decoding operations to obtain the macroblock A. The decoding module decodes a1 41 of the first logic unit 72 to obtain the decoded parameter A1. Then the decoding module decodes a2 42 of the second logic unit 74 to obtain the decoded parameter A2 without immediately decoding b1 44 and c1 47 of the first logic unit 72. After a2 42 is decoded, the decoding module decodes a3 43 of the third logic unit 75 to obtain the decoded parameter A3 without immediately decoding b2 45 and c2 48. After a3 43 is decoded and the decoded parameter A3 is obtained, the decoded parameters A1, A2, and A3 are transmitted to the parameter packer 94. The parameter packer 94 integrates A1, A2, and A3 to obtain the data required for later decoding operations to obtain the macroblock A and outputs the first decoded parameter (DP1) and the second decoded parameter (DP2).

After the data required for later decoding operations to obtain the macroblock A are obtained, the decoding module decodes b1 44 of the first logic unit 72 to obtain the decoded parameter B1; then the decoding module decodes b2 45 of the second logic unit 74 to obtain the decoded parameter B2 without immediately decoding c1 47 in the first logic unit 72. After b2 45 is decoded, the decoding module decodes b3 46 of the third logic unit 75 to obtain the decoded parameter B3 without immediately decoding c2 48. After b3 46 is decoded and the decoded parameter B3 is obtained, the decoded parameters B1, B2, and B3 are transmitted to the parameter packer 94. The parameter packer 94 integrates B1, B2, and B3 to obtain the data required for later decoding operations to obtain the macroblock B and outputs the first decoded parameter (DP1) and the second decoded parameter (DP2).

After the data required for later decoding operations to obtain the macroblock B are obtained, the decoding module decodes c1 47 of the first logic unit 72 to obtain the decoded parameter C1. Then the decoding module decodes c2 48 of the second logic unit 74 to obtain the decoded parameter C2. Then, the decoding module decodes c3 49 of the third logic unit 75 to obtain the decoded parameter C3. The decoded parameters C1, C2, and C3 are transmitted to the parameter packer 94. The parameter packer 94 integrates the decoded parameters C1, C2, and C3 to obtain the data required for later decoding operations to obtain the macroblock C and outputs the first decoded parameter (DP1) and the second decoded parameter (DP2).

In the embodiment shown in FIG. 5, after the encoded parameters corresponding to the video macroblock located in the first, the second, and the third logic units are sequentially obtained, the macroblock can be reconstructed by further decoding these decoded parameters. In other words, in the embodiment the encoded parameters are decoded instantly, and the encoded parameters do not need to be temporarily stored in the memory for later retrieval. Thus memory space is saved. The time and the memory bandwidth required to store and retrieve data from the memory is also saved, and the cost is reduced.

Besides, the embodiments also illustrate a decoding method for decoding a video bit stream 60. The video bit stream 60 includes a plurality of video packets. Each of the video packets includes a packet header and a plurality of logic units. Each logic unit includes at least one encoded parameter. The encoded parameter has at least one corresponding encoded parameter located in other logic unit. The encoded parameter and the corresponding encoded parameter separately embedded in other logic units are decoded to reconstruct a corresponding video macroblock. The packet header could be used to indicate the starting address of the first logic unit in the video bit stream. Each video packet may include a resynchronization marker, which may be located between two logic units of a video packet.

The decoding method includes the following steps:

Step 1: locate the starting decoding addresses of all logic units of the video packet by a searching procedure; and Step 2: decode the encoded parameters of the logic units according to the starting decoding addresses, so as to obtain in the furtherance a plurality of pixel data required to form the macroblock.

Besides, the video bit stream is a data partition video bit stream. That is, the plurality of pixel data required to form the macroblock are encoded as a plurality of encoded parameters, and these parameters are separated into different logic units of a video packet through a data partition procedure.

Moreover, step 1 of the decoding operation further includes:

First, search for the starting decoding address of the first of the logic units in the video bit stream 60;

Next, search for the resynchronization marker in the video packet to obtain the starting decoding address of the logic unit next to the resynchronization marker.

For each of logic units whose starting decoding address has not been located in the aforementioned process, a fast decoding procedure is performed to the logic unit just prior it, so as to obtain it's corresponding starting decoding address.

Finally, perform the aforementioned fast decoding procedure until the corresponding starting decoding addresses of all the logic units have been obtained.

The decoding method searches the packet header of the video packet in the video bit stream to obtain the starting decoding address of the first of the logic unit of the video packet. The fast decoding procedure is performed in a variable-length decoding module; the fast decoding procedure is used only for obtaining the starting decoding address of a logic unit. Therefore, the decoded data obtained through the fast decoding procedure do not need to be stored in the memory.

By the decoding method of the video bit stream of the embodiment, the advantages, such as saving memory space, saving time and the bandwidth required when storing and reading data, and further decreasing the cost, can be achieved.

Compared with the related art, the searching procedure of the embodiment searches for the starting decoding addresses of all the logic units in a video packet. Then, the embodiment decodes the encoded parameters of the logic units according to the starting decoding addresses, so as to obtain data required for later decoding operation to obtain a plurality of pixel data of a macroblock. Since the embodiment does not have to temporarily store or read any of the decoded data obtained by decoding the first and second logic unit in the memory, the embodiment saves memory space, time and the bandwidth required when storing and reading data and hence, the system cost can be decreased substantially.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for decoding an encoded video bit stream to produce pixel data of a first macroblock and a second macroblock, the video bit stream comprising at least one video packet, the video packet comprising in sequential order a packet header, a first logic unit, a second logic unit, and a third logic unit, the first logic unit comprising parameters a1 and b1, the second logic unit comprising parameters a2 and b2, the third logic unit comprising parameters a3 and b3, the parameters a1 and a2 used for reconstructing a first macroblock, the parameters b1 and b2 used for reconstructing a second macroblock, the method comprising:

a first step of locating a first address indicating location of the first logic unit;

a second step of decoding the first logic unit to obtain a decoded parameter A1 corresponding to the parameter a1;

a third step of locating a second address indicating location of the second logic unit;

a fourth step of decoding the second logic unit to obtain a decoded parameter A2 corresponding to the parameter a2;

a fifth step of locating a third address indicating location of the third logic unit;

a sixth step of decoding the third logic unit to obtain a decoded parameter A3 corresponding to the parameter a3;

a seventh step of producing the pixel data of the first macroblock using the decoded parameters A1, A2 and A3.

2. The method of claim 1, wherein the fourth step is performed without storing a decoded parameter B2 corresponding to parameter b2 into the memory.

3. The method of claim 1, wherein the sixth step is performed without obtaining and storing a decoded parameter B3 corresponding to the parameter b3 into the memory.

4. The method of claim 1, wherein the first address is located by locating the packet header.

5. The method of claim 1, wherein the second address is located by searching for a specific marker in the video packet.

6. The method of claim 5, wherein the specific marker is a resynchronization marker.

7. The method of claim 1, wherein the third address is located by decoding the second logic unit without storing decoded data into the memory.

8. The method of claim 1, wherein the second step, the fourth step, and the sixth step are performed simultaneously.

9. The method of claim 1, wherein the second step, the fourth step, and the sixth step are performed sequentially.

10. A video decoding apparatus for decoding an encoded video bit stream to produce pixel data of a first macroblock and a second macroblock, the video bit stream comprising at least one video packet, the video packet comprising in sequential order a packet header, a first logic unit, a second logic unit, and a third logic unit, the first logic unit comprising parameters a1 and b1, the second logic unit comprising parameters a2 and b2, the third logic unit comprising parameters a3 and b3, the parameters a1 and a2 used for reconstructing a first macroblock, the parameters b1 and b2 used for reconstructing a second macroblock, the video decoding apparatus comprising:
a searching module for locating a first address indicating location of the first logic unit, a second address indicating location of the second logic unit;
a decoding module for decoding the first logic unit to obtain a decoded parameter A1 corresponding to the parameter a1, decoding the second logic unit to obtain a decoded parameter A2 corresponding to the parameter a2, and decoding the third logic unit to obtain a decoded parameter A3 corresponding to the parameter a3,
wherein the decoded parameters A1, A2, and A3 are used to produce the pixel data of the first macroblock.

11. The video decoding apparatus of clam 10, wherein the decoding module further includes a plurality of decoders to decode the first logic unit, the second logic unit, and the third logic unit in a parallel manner.

12. The video decoding apparatus of clam 11, wherein the plurality of decoders are variable length decoders.

13. The video decoding apparatus of clam 10, wherein the decoding module further include a variable length decoder to sequentially decode the first logic unit, the second logic unit, and the third logic unit.

14. The video decoding apparatus of clam 10, wherein the searching module locates the first address by locating the packet header.

15. The video decoding apparatus of clam 10, wherein the searching module locates the second address by searching for a resynchronization marker.

16. The video decoding apparatus of clam 10, wherein the searching module locates a third address indicating location of the third logic unit by decoding the second logic unit.

17. A method for decoding an encoded video bit stream to produce pixel data of a first macroblock and a second macroblock, the video bit stream comprising at least one video packet, the video packet comprising a first logic unit and a second logic unit, the first logic unit comprising parameters a1 and b1, the second logic unit comprising parameters a2 and b2, the parameters a1 and a2 used for reconstructing a first macroblock, the parameters b1 and b2 used for reconstructing a second macroblock, the method comprising:
a first step of locating a first address indicating location of the first logic unit and locating a second address indicating location of the second logic unit;
a second step of decoding the first logic unit to obtain a decoded parameter A1 corresponding to the parameter a1 and decoding the second logic unit to obtain a decoded parameter A2 corresponding to the parameter a2, and
a third step of producing the pixel data of the first macroblock using the decoded parameters A1 and A2.

18. The method of claim 17, wherein the video bit stream further comprising a packet header, and the first step of locating the first address is performed by locating the packet header.

19. The method of claim 17, wherein the first step of locating the second address is performed by searching for a specific marker in the video packet or by decoding the first logic unit.

20. The method of claim 17, wherein the first step of locating the first address and the second address is performed without obtaining and storing decoded parameters B1 and B2 respectively corresponding to the parameters b1 and b2 into a memory.

* * * * *